United States Patent
Bierbaum et al.

(10) Patent No.: US 8,225,997 B1
(45) Date of Patent: Jul. 24, 2012

(54) SINGLE TRANSIT CARD TO MULTIPLE RIDER TRIP METHODS AND ARCHITECTURE

(75) Inventors: Christopher J. Bierbaum, Overland Park, KS (US); Robin D. Katzer, Olathe, KS (US); Todd N. Koellner, Overland Park, KS (US); Kevin K. Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 617 days.

(21) Appl. No.: 12/342,066

(22) Filed: Dec. 22, 2008

(51) Int. Cl.
*G06K 5/00* (2006.01)
(52) U.S. Cl. ........ 235/384; 235/375; 235/379; 235/380; 235/382; 235/383
(58) Field of Classification Search .................. 235/379, 235/380, 383, 375, 382, 384
See application file for complete search history.

(56) References Cited

U.S. PATENT DOCUMENTS

| | | | |
|---|---|---|---|
| 5,590,038 A * | 12/1996 | Pitroda | 705/41 |
| 5,819,234 A | 10/1998 | Slavin et al. | |
| 5,991,749 A | 11/1999 | Morrill, Jr. | |
| 6,003,776 A * | 12/1999 | Drupsteen | 235/492 |
| 6,736,317 B1 | 5/2004 | McDonald et al. | |
| 7,224,291 B2 | 5/2007 | Hassett | |
| 7,356,541 B1 | 4/2008 | Doughty | |
| 7,527,208 B2 | 5/2009 | Hammad et al. | |
| 7,562,818 B1 * | 7/2009 | Bierbaum et al. | 235/384 |
| 7,911,382 B2 | 3/2011 | Liu et al. | |
| 7,922,084 B2 | 4/2011 | Ishibashi et al. | |
| 8,126,769 B1 | 2/2012 | Bierbaum et al. | |
| 8,181,867 B1 | 5/2012 | Bierbaum et al. | |
| 2002/0002534 A1 | 1/2002 | Davis et al. | |
| 2002/0004762 A1 * | 1/2002 | Izumoto | 705/26 |
| 2002/0133409 A1 | 9/2002 | Sawano et al. | |
| 2002/0161729 A1 * | 10/2002 | Andrews | 705/417 |
| 2004/0016801 A1 * | 1/2004 | Newsome et al. | 235/382 |
| 2004/0139018 A1 | 7/2004 | Anderson et al. | |
| 2005/0125317 A1 * | 6/2005 | Winkelman et al. | 705/30 |
| 2006/0189297 A1 | 8/2006 | Jung | |
| 2007/0034107 A1 | 2/2007 | Barbeau et al. | |
| 2007/0150949 A1 | 6/2007 | Futamura et al. | |
| 2007/0210936 A1 | 9/2007 | Nicholson | |
| 2008/0068221 A1 | 3/2008 | Park | |
| 2008/0116264 A1 * | 5/2008 | Hammad et al. | 235/382 |

(Continued)

FOREIGN PATENT DOCUMENTS

GB 2152720 A 8/1985

OTHER PUBLICATIONS

Office Action dated Feb. 17, 2011, U.S. Appl. No. 12/187,953, filed Aug. 7, 2008.

(Continued)

*Primary Examiner* — Ali Sharifzada

(57) ABSTRACT

A mobile device is provided. The mobile device comprises a near field communication transceiver, a memory that contains a secure element, and an application that can pay multiple transit fares. The near field communication transceiver is used to complete fare payment transactions with a fare gate, based on a transit funds balance. The secure element in the memory stores the transit funds balance. The application, when executed on the mobile device, pays a plurality of fares corresponding to a plurality of passengers entering a public transportation system via the fare gate at substantially the same time.

8 Claims, 5 Drawing Sheets

U.S. PATENT DOCUMENTS

| | | | |
|---|---|---|---|
| 2008/0156873 | A1 | 7/2008 | Wilhelm et al. |
| 2008/0201212 | A1* | 8/2008 | Hammad et al. ............... 705/13 |
| 2008/0208681 | A1* | 8/2008 | Hammad et al. ............... 705/13 |
| 2009/0002237 | A1 | 1/2009 | Nonoyama |
| 2009/0015398 | A1 | 1/2009 | Bhogal et al. |
| 2010/0121563 | A1 | 5/2010 | Chavez et al. |
| 2010/0292921 | A1 | 11/2010 | Zachariah et al. |

OTHER PUBLICATIONS

Balaban, Dan, "Japan Goes Mobile With Transit Ticketing," Card Technology, May 2006, vol. 11, Issue 5, pp. 18-20.

Bierbaum, Christopher J., et al., Patent Application entitled "Transit Card State Sequence Self-Help Correction," filed Aug. 7, 2008, U.S. Appl. No. 12/187,953.

Bierbaum, Christopher J., et al., Patent Application entitled "Transit Card Credit Authorization," filed Jan. 6, 2009, U.S. Appl. No. 12/349,513.

Bierbaum, Christopher J., et al., Patent Application entitled "Transit Payment and Handset Navigation Integration," filed Jan. 6, 2009, U.S. Appl. No. 12/349,509.

Gregoire, Lisa, "Visa Removes Canada 3000 Credit Charge," Edmonton Journal, Mar. 9, 2002, p. B.7, Edmonton, Alta.

Office Action dated May 10, 2010, U.S. Appl. No. 12/187,953, filed Aug. 7, 2008.

Final Office Action dated Oct. 20, 2010, U.S. Appl. No. 12/187,953, filed Aug. 7, 2008.

Final Office Action dated Aug. 4, 2011, U.S. Appl. No. 12/187,953, filed Aug. 7, 2008.

Office Action dated Jun. 22, 2011, U.S. Appl. No. 12/349,509, filed Jan. 6, 2009.

Notice of Allowance dated Jan. 20, 2012, U.S. Appl. No. 12/349,513, filed Jan. 6, 2009.

Notice of Allowance dated Oct. 17, 2011, U.S. Appl. No. 12/187,953, filed Aug. 7, 2008.

Pre-Interview Communication dated Dec. 7, 2011, U.S. Appl. No. 12/349,513, filed Jan. 6, 2009.

Office Action—Restriction Requirement dated Dec. 20, 2011, U.S. Appl. No. 12/349,509, filed Jan. 6, 2009.

Notice of Allowance dated Apr. 25, 2012, U.S. Appl. No. 12/349,509, filed on Jan. 6, 2009.

* cited by examiner

SINGLE TRANSIT CARD TO MULTIPLE RIDER TRIP METHODS AND ARCHITECTURE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The public transportation systems in some cities may allow passengers to enter a transit fare gate by using a mobile device (e.g., cell phone, personal digital assistant) that contains some form of an electronic transit fund card. An application in the transportation computer system may record the fare gate locations where a user entered and exited the transportation system and then use the information to calculate a fare. As transit fares are deducted from the user's transit fund account and the transit fund balance drops below a pre-defined level, a top-up request may be sent to the transportation payment system, which may communicate with a credit card company, to add funds to the transit fund balance associated with the mobile device.

The mobile device may communicate with a fare gate using a near field communication (NFC) transceiver if the mobile device is held in close proximity of the fare gate. The mobile device, in most scenarios, can also communicate with a wireless service provider server using a radio access network transceiver.

SUMMARY

In an embodiment, a mobile device is provided. The mobile device comprises a near field communication transceiver, a memory that contains a secure element, and an application that can pay multiple transit fares. The near field communication transceiver is used to complete fare payment transactions with a fare gate, based on a transit funds balance. The secure element in the memory stores the transit funds balance. The application, when executed on the mobile device, pays a plurality of fares corresponding to a plurality of passengers entering a public transportation system via the fare gate at substantially the same time.

In another embodiment, a transportation system ticket kiosk is also provided. The ticket kiosk comprises a processor, a near field communication transceiver, and an application. The application, when executed on the processor, receives a request message, via the near field communication transceiver from the first mobile device, to fund transportation for a plurality of passengers. The application then transmits a fare deduction message, via the near field communication transceiver, back to the first mobile device with instructions to deduct fares for each of the plurality of passengers from a transit funds balance of the first mobile device.

In another embodiment, a method of transferring transit funds between mobile devices is provided. The method comprises wirelessly transferring funds from a first transit funds balance in a first mobile device to a second transit funds balance in a second mobile device, based on a user initiated funds transfer which identifies the second mobile device. The method also comprises tapping a transportation system fare gate with the first mobile device to enter the transportation system and then admitting a first passenger associated with the first mobile device to the transportation system based on the first transit funds balance. The method also comprises tapping the transportation system fare gate with the second mobile device to enter the transportation system and then admitting a second passenger associated with the second mobile device to the transportation system based on the second transit funds balance.

BRIEF DESCRIPTION OF THE DRAWINGS

For a more complete understanding of the present disclosure, reference is now made to the following brief descriptions, taken in connection with the accompanying drawings and detailed description, wherein like reference numerals represent like parts.

DETAILED DESCRIPTION

Figure 1:
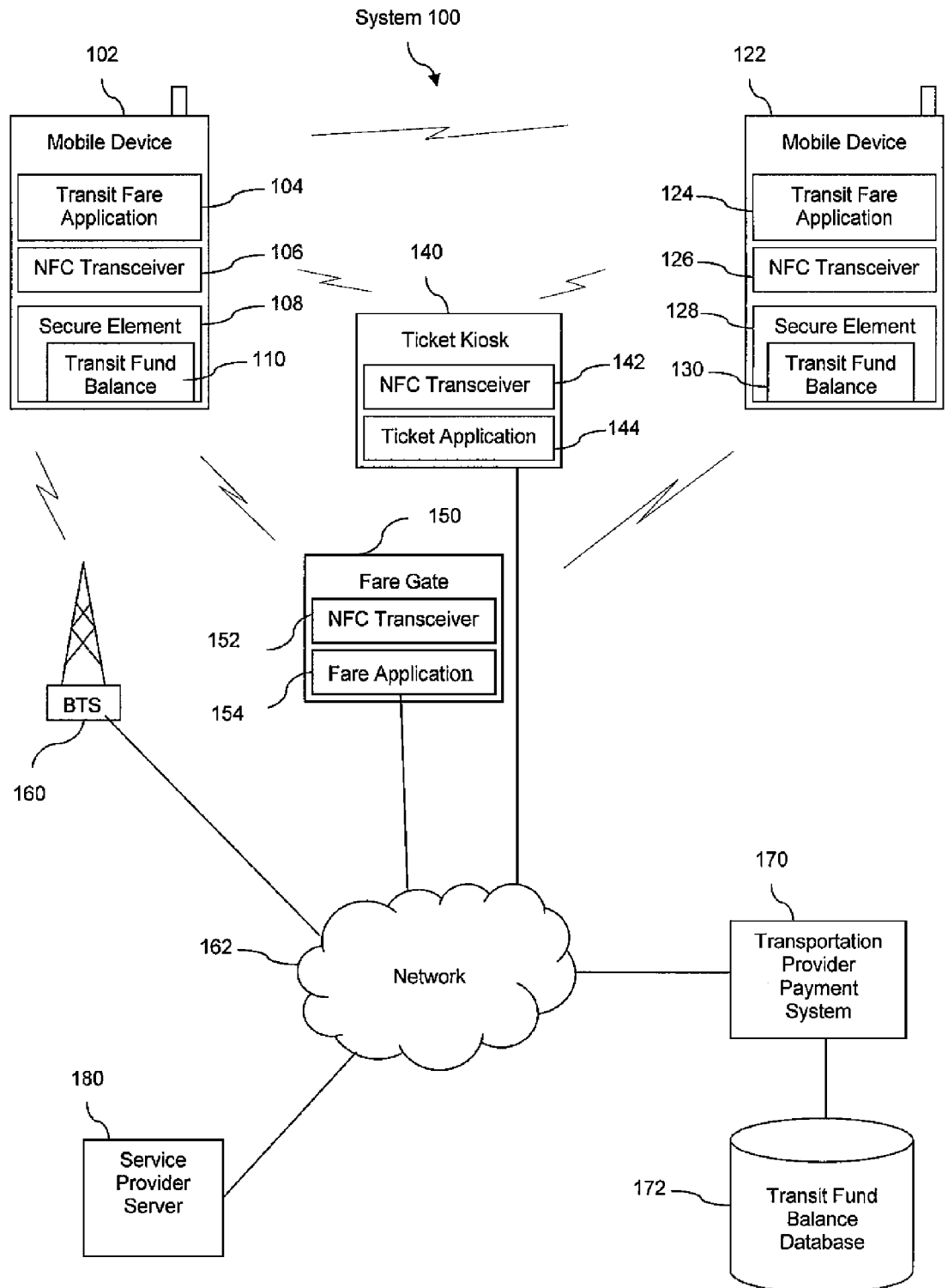
FIG. 1 illustrates a transit fare payment system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A method to transfer transit fare funds from a mobile device to one or more other mobile devices and/or one or more other passengers is disclosed. In an embodiment, a mobile device, that contains a transit fare card used to enter a public transportation system through a fare gate, can be used to pay fares for one or more other passengers to enter the same transportation system. The mobile device could be a mobile phone, a media player, a personal digital assistant, or other type of portable electronic device. A near field communication (NFC) transceiver in the mobile device may allow communication with another mobile device, a fare gate, and/or a transportation system ticket kiosk. A secure element in the memory of the mobile device stores the transit fund balance information for each mobile device. In addition, the transit fare card monitors the balance of the transit fund and initiates a top-up of funds when the balance falls below a pre-defined amount.

In one embodiment, a transit fare application in the mobile device could be used to allow the transit fare card to pay for multiple passengers by deducting multiple fares from the transit fund balance. Alternatively, the mobile device may contain multiple transit fare cards (e.g., one for each member of a family), wherein each card maintains a separate transit fund balance. In this scenario, the transit fare application deducts the appropriate fare amount from the transit fund balance of the associated passenger, as identified by the user of the mobile device.

In another embodiment, a mobile device, with a near field communication transceiver, can be used to purchase multiple transit tickets from a transportation system ticket kiosk that also contains a near field communication transceiver. An application in the kiosk verifies the transit fund balance of the mobile device before it allows the purchase of tickets, then deducts the appropriate funds for the same number of tickets. The tickets could be physical tickets (e.g., paper tickets, tokens) dispensed from the kiosk and handed out to passengers who do not have mobile devices, or electronic tickets transmitted to the first mobile device and to other mobile devices as identified by the user of the first mobile device.

In another third embodiment, transit funds can be transferred from one mobile device to another mobile device, wherein the user of the first mobile device identifies the second mobile device and the amount of funds to transfer, to allow both users to pass through a public transportation system fare gate. As an example, the transportation system fare gate could be used to mediate the transfer of funds using near field communication transceivers. In this example, an application in the fare gate sends instructions though a secure element in the first mobile device to subtract funds from the transit fund balance on the first mobile device and then sends instructions through a secure element on the second mobile device to add funds to the transit fund balance of the second mobile device. As an alternative to using the fare gate to mediate the transfer of funds, a kiosk, used by the transportation payment system to sell tickets, can use near field communication transceivers to electronically transfer transit funds from one mobile device to another mobile device. In this scenario, the kiosk authenticates the balance of funds on the first mobile device before it transfers the funds to the second mobile device. Another alternative method to transfer transit fare funds, is to use near field communication to directly transfer the fare amount from one mobile device to another mobile device without a mediating device such as a fare gate or a kiosk.

Turning now to FIG. 1, a system 100 for transferring transit funds between mobile devices is disclosed. The system 100 comprises a first mobile device 102, a second mobile device 122, a ticket kiosk, 140, a fare gate 150, a base transceiver station 160, a network 162, a transportation provider payment system 170, a transit fund balance database 172, and a service provider server 180. The first mobile device 102 is comprised of a transit fare application 104, a near field communication transceiver 106, a secure element 108, and a transit fund balance 110 and may be implemented as a mobile phone, personal digital assistant, media player, or any other mobile device having wireless communication capability. A mobile device is discussed in detail hereinafter. The second mobile device 122 represents multiple additional mobile devices (only one second mobile device is shown) and is comprised of a transit fare application 124, a near field communication transceiver 126, a secure element 128, and a transit fund balance 130. The ticket kiosk 140 is comprised of a near field communication transceiver 142 and a ticket application 144. The fare gate 150 represents multiple fare gates (only one gate is shown) each comprised of a near field communication transceiver 152 and a fare application 154. The transportation provider payment system 170, and the service provider server 180 may each be implemented as a general purpose computer. General purpose computers are discussed in detail hereinafter.

In an embodiment, the first mobile device 102 may use near field communication to transfer transit fare funds to the second mobile device 122 via the fare gate 150, the ticket kiosk 140, or direct wireless communication with the second mobile device 122. The first mobile device 102 communicates with the service provider server 180 and the transportation provider payment system 170 through the base transceiver station 160 and the network 162. The transportation provider payment system 170 may use the transit fund balance database 172 to track the transit fund balance 110 of the mobile device 102. When the transit fund balance 110 of the mobile device 102 falls below a pre-defined amount, the transit fare application 104 may initiate a top-up of funds to add to the transit fund balance 110.

In one embodiment, a transit passenger may interact with a user interface provided on the first mobile device 102, for example, an interface and/or menu provided by the transit fare application 104, to initiate a request to purchase a plurality of fares. The first mobile device 102 may then communicate with the fare gate 150, via the near field communication transceiver 106, to purchase a plurality of transit fares for a plurality of passengers to enter the public transportation system though the fare gate 150. The transit fare application 104 checks the transit fund balance 110, which is stored in the secure element 108 of the first mobile device 102, to verify that sufficient funds are available. The transit fund balance 110 may exist as one fund associated with one transit fare card on the first mobile device 102 or as multiple funds associated with multiple transit fare cards all on the first mobile device 102 (e.g., one for each member of a family). The transit fare application 104 can deduct the plurality of fares from the transit fund balance 110 either as one total deduction for the combined fares or as a separate deduction from each transit fare card each having its own transit fund balance.

In another embodiment, the ticket kiosk 140, can be used to purchase multiple transit tickets for multiple passengers. The ticket kiosk 140 may receive a request from the first mobile device 102, via the near field communication transceiver 142, to fund transportation for multiple passengers. The ticket application 144 in the ticket kiosk 140 verifies the transit fund balance 110 in the mobile device 102 and then transmits a message back to the first mobile device 102, via the near field communication transceiver 106, to deduct the appropriate number of fares from the transit fund balance. The ticket kiosk 140 could either dispense physical tickets (e.g., paper tickets, tokens) to give to passengers who do not have mobile devices, or it can transmit electronic tickets to both the first mobile device 102 and the second mobile device 122, which can then be used to enter the transportation system.

In another embodiment, transit funds can be transmitted wirelessly from the first mobile device 102 to the second mobile device 122 to allow both mobile device users to enter the transportation system. The user of the first mobile device 102 can activate the transit fare application 104 to identify the second mobile device 122 and then to transfer funds from the transit fund balance 110 in the first mobile device 102 to the transit fund balance 130 in the second mobile device 122. The transfer of funds could be mediated either by the fare gate 150 or by the ticket kiosk 140. Alternatively, the first mobile device 102 may transfer the funds directly to the second mobile device 122.

In an example of using the fare gate 150 to mediate the transfer of funds, the near field communication transceiver 106 in the first mobile device 102 communicates with the near field communication transceiver 152 in the fare gate 150 to request a transfer. The fare application 154 in the fare gate 150 verifies the transit fund balance 110 stored in the secure element 108 of the second mobile device 102 and sends instructions to subtract an amount of funds from the transit fund balance 110. The fare application 154 in the fare gate 150 then communicates, via the near field communication transceiver 152, with the secure element 128 in the second mobile device 122 to add the same amount of funds to the transit fund balance 130.

In an example of using the ticket kiosk 140 to mediate the transfer of funds, the near field communication transceiver 106 in the first mobile device 102 communicates with the near field communication transceiver 142 in the ticket kiosk 140. The ticket application 144 in the ticket kiosk 140 subtracts an amount of funds from the transit fund balance 110 in the first mobile device 102 and then communicates, via the near field communication transceiver 126, with the second mobile device 122 to add the same amount of funds to the transit fund balance 130.

In an example of wirelessly transferring funds directly from one mobile device to another mobile device, the transit fare application 104 in the first mobile device 102 communicates directly with the transit fare application 124 in the second mobile device 122 using near field communication. The transit funds are subtracted from the transit fund balance 110 in the first mobile device 102 and then added to the transit fund balance 130 in the second mobile device 122. In an embodiment of this implementation, once the transit funds are successfully transferred from the first mobile device 102 to the second mobile device 122, regardless of the method used to transfer the funds, the first user may be admitted into the transportation system by tapping the fare gate 150 with the first mobile device 102 and then the second user may be admitted into the transportation system by tapping the same fare gate 150 with the second mobile device 122.

Figure 2:
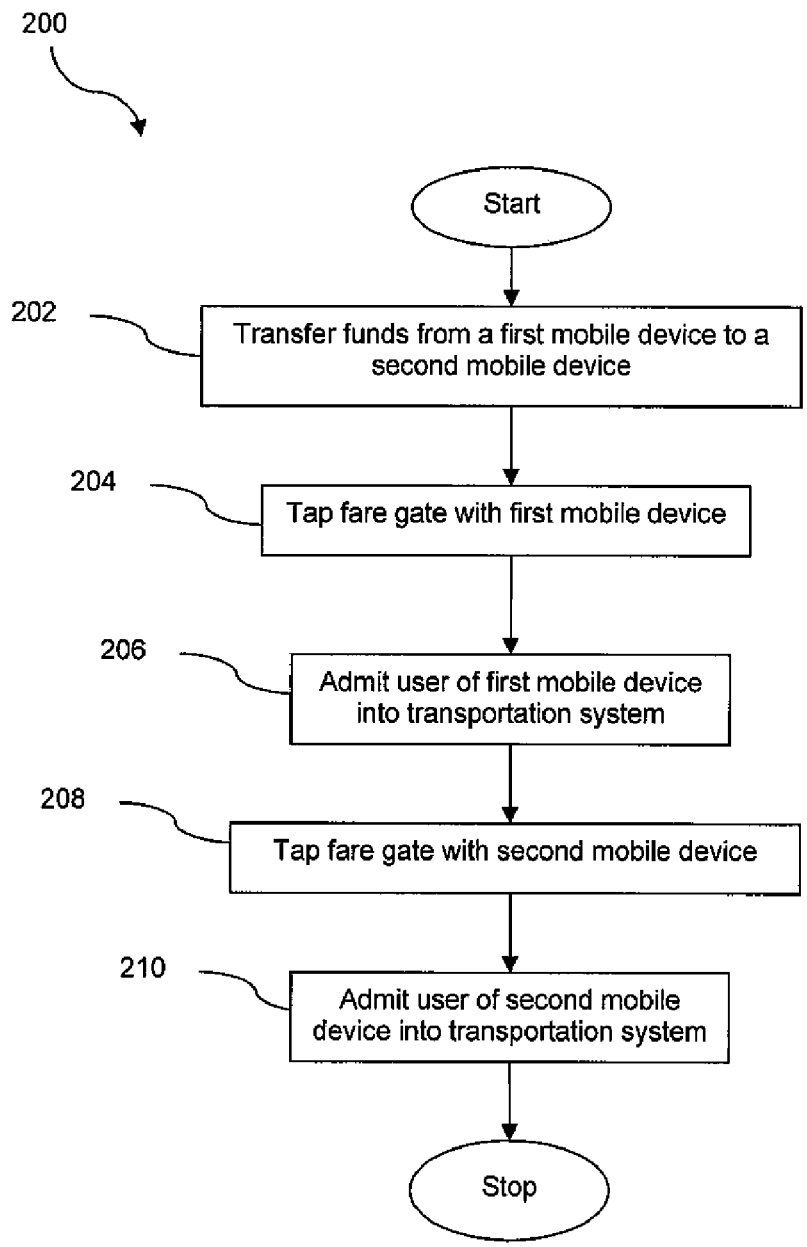
FIG. 2 is a flow chart of a method of transferring transit fare funds according to an embodiment of the disclosure.

Turning now to FIG. 2, a method 200 of transferring transit funds between mobile devices is described. The method 200 begins at block 202 where funds are wirelessly transferred, via near field communication, from the first mobile device 102 to the second mobile device 122. The user of the first mobile device 102 uses the transit fare application 104 to identify the second mobile device 122 and the amount of funds to transfer, for example by providing input to a user interface associated with the transit fare application 104 displayed on the first mobile device 102. The transfer of funds can be mediated by the transportation system fare gate 150 or by the ticket kiosk 140. Alternatively, the first mobile device 102 may transfer the funds directly to the second mobile device 122. Depending on the method used to transfer funds, instructions may be sent to the secure element 108 in the first mobile device 102 to deduct the fare amount from the transit fund balance 110. In some embodiments, if replenishment funds are required for the transit fund balance 110 in the first mobile device 102, the transit fare application 104 may request a top-up of funds from the transportation provider payment system 170, via the base transceiver station 160 and the network 162. Once the transit fund balance 110 is verified, instructions may also be sent to the secure element 128, in the second mobile device 122, to add the fare amount to the transit fund balance 130.

After the transit fares are transferred to the second mobile device 122, the method 200 moves to block 204 where the first user taps the fare gate 150 with the first mobile device 102. In block 206, the transit fund balance 110 of first mobile device 102 is verified and the first user is admitted into the transportation system. Moving to block 208, the second user taps the fare gate 150 with the second mobile device 122. In block 210, the transit fund balance 130 of the second mobile device 122 is verified and the second user is admitted into the transportation system.

Figure 3:
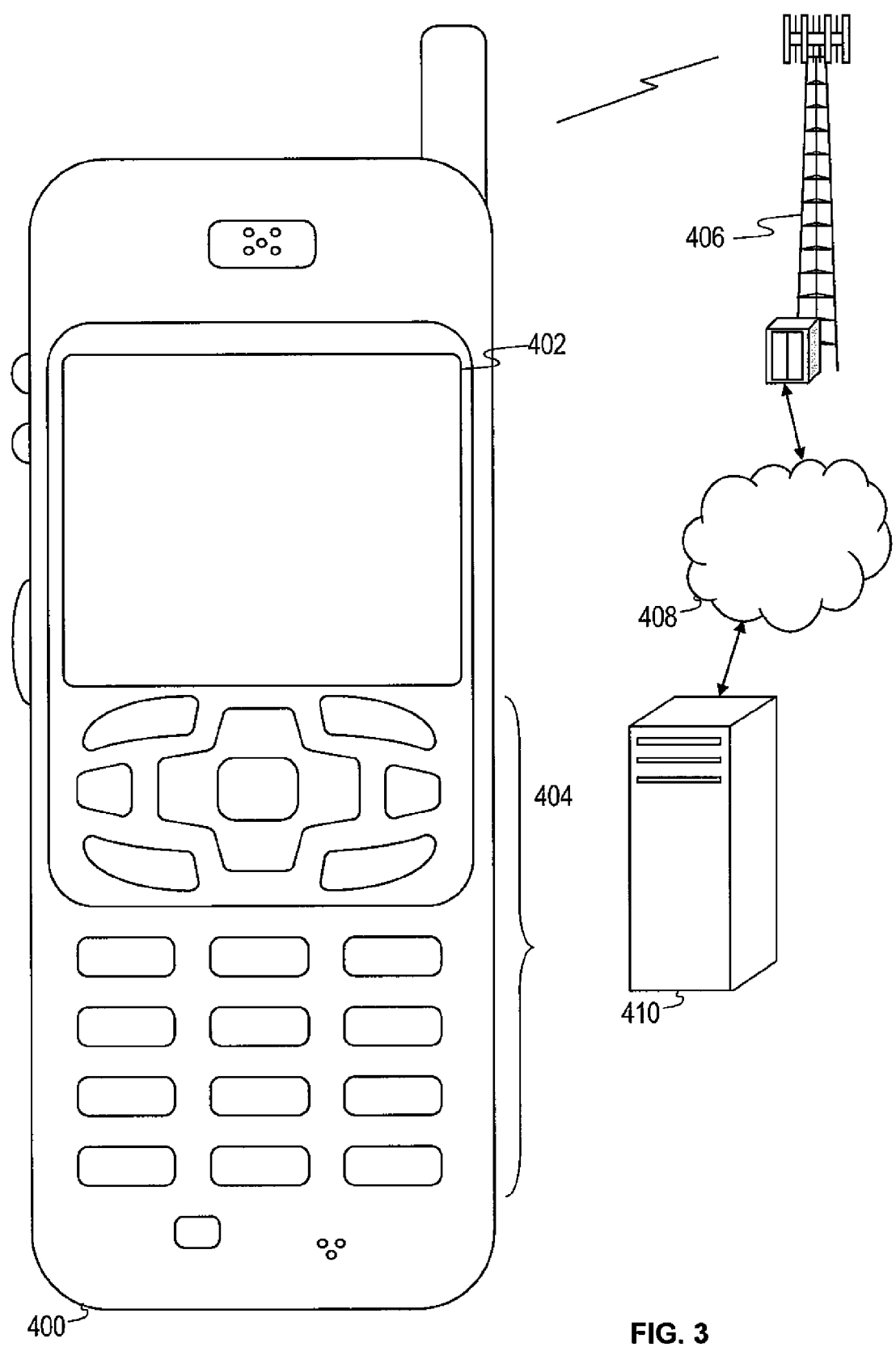
FIG. 3 illustrates a handset suitable for implementing an embodiment of the disclosure.

FIG. 3 illustrates a wireless communications system including the mobile device 400, which may be similar to the first mobile device 102 and the second mobile device 122. FIG. 3 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, or a laptop computer. Many suitable handsets combine some or all of these functions. In some embodiments of the present disclosure, the mobile device 400 is not a general purpose computing device like a portable, laptop or tablet computer, but rather is a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface or keys 404 for input by a user. The mobile device 400 may present options for the user to select, controls for the user to actuate, and/or cursors or other indicators for the user to direct. The mobile device 400 may further accept data entry from the user, including numbers to dial or various parameter values to configure the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device.

The mobile device 400 may execute a web browser application which enables the display 402 to show a web page. The web page may be obtained via wireless communications with a base transceiver station (BTS) 406, a wireless network access node, a peer mobile device 400 or any other wireless communication network or system. While a single base transceiver station 406 is illustrated, it is understood that the wireless communication system may comprise additional base transceiver stations. In some instances, the mobile device 400 may be in communication with multiple base transceiver stations 406 at the same time. The base transceiver station 406 (or wireless network access node) is coupled to a wired network 408, such as the internet. Via the wireless link and the wired network, the mobile device 400 has access to information on various servers, such as a server 410. The server 410 may provide content that may be shown on the display 402. Alternately, the mobile device 400 may access the base transceiver station 406 through a peer mobile device 400 acting as an intermediary, in a relay type or hop type of connection.

Figure 4:
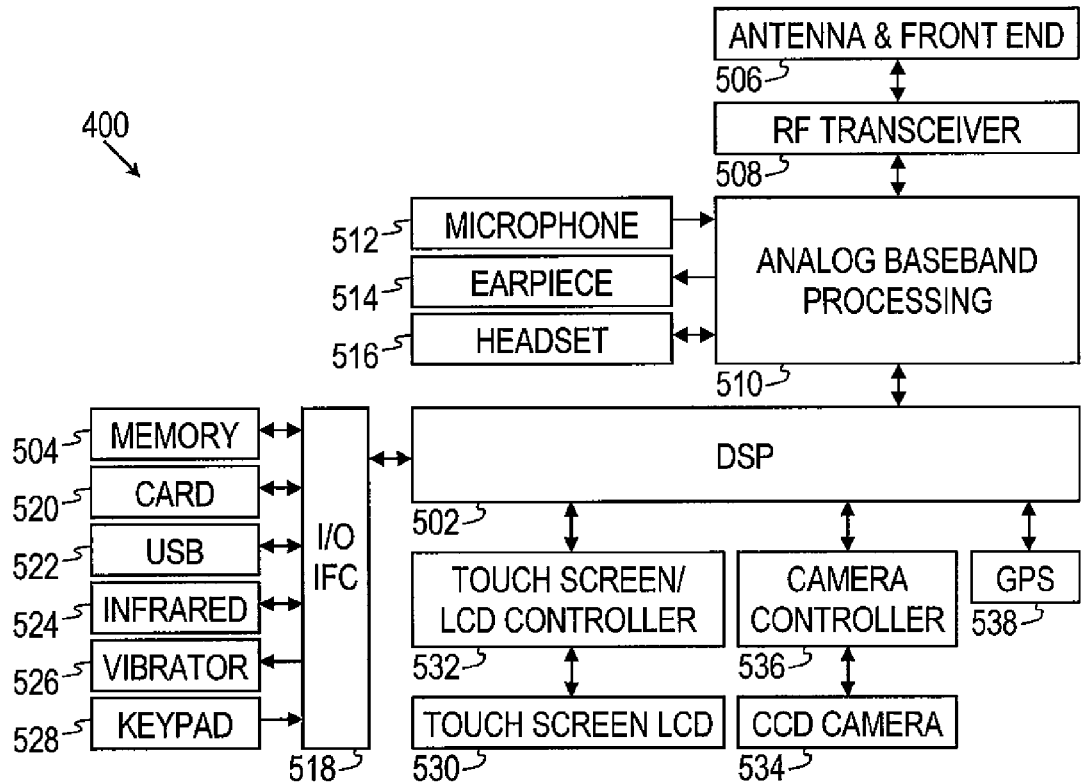
FIG. 4 is a block diagram of a handset suitable for implementing an embodiment of the disclosure.

FIG. 4 shows a block diagram of the mobile device 400. While a variety of known components of handsets 400 are depicted, in an embodiment, a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media (e.g., the removable memory card 520) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converts received RF signals to baseband, and converts baseband transmit signals to RF. In some descriptions, a radio transceiver or RF transceiver may include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs. For example, analog processing of inputs from the microphone 512 and the headset port 516 and outputs to the earpiece speaker 514 and the headset port 516. To that end, the analog baseband processing unit 510 may have ports that connect to the built-in microphone 512 and the earpiece speaker 514 that enable the mobile device 400 to be used as a mobile phone. The analog baseband processing unit 510 may further include a port to connect to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components such as the DSP 502 or other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, in a code division multiple access (CDMA) technology application for a transmitter function, the DSP 502 may perform modulation, coding, interleaving, and spreading. For a receiver function the DSP 502 may perform despreading, deinterleaving, decoding, and demodulation. In another embodiment, in an orthogonal frequency division multiplex access (OFDMA) technology application for the transmitter function, the DSP 502 may perform modulation, coding, interleaving, inverse fast Fourier transforming, and cyclic prefix appending. For a receiver function, the DSP 502 may perform cyclic prefix removal, fast Fourier transforming, deinterleaving, decoding, and demodulation. In other wireless technology applications, additional signal processing functions and combinations of signal processing functions may be performed by the DSP 502.

The DSP 502 may communicate with a wireless network via the analog baseband processing unit 510. In some embodiments, the communication may provide internet connectivity to enable a user to gain access to content on the internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The input/output interface 518 may further connect the DSP 502 to the vibrator 526, so that when triggered, causes the mobile device 400 to vibrate. The vibrator 526 may serve as a mechanism to silently alert the user to any of various events (e.g., an incoming call, a new text message, an appointment reminder).

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions such as radio and television reception.

Figure 5:
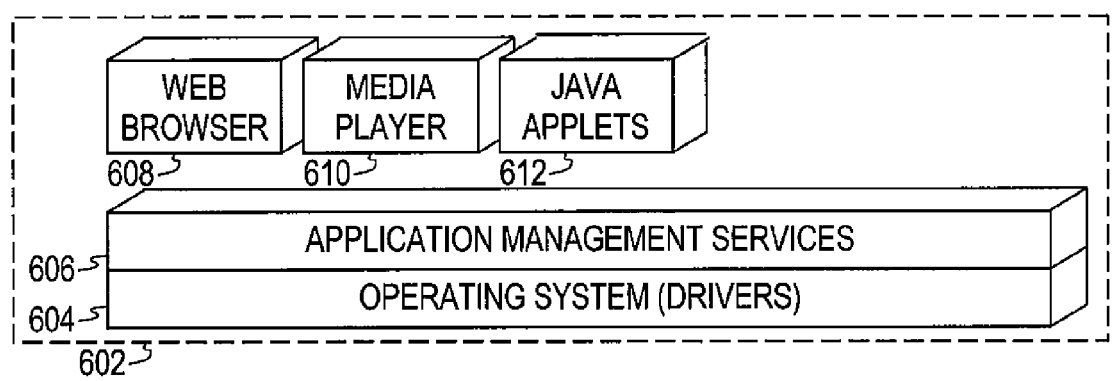
FIG. 5 is a block diagram of a software architecture of a handset suitable for implementing an embodiment of the disclosure.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services (AMS) 606 that transfer control between applications that run on the mobile device 400. Also shown in FIG. 5 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 6:
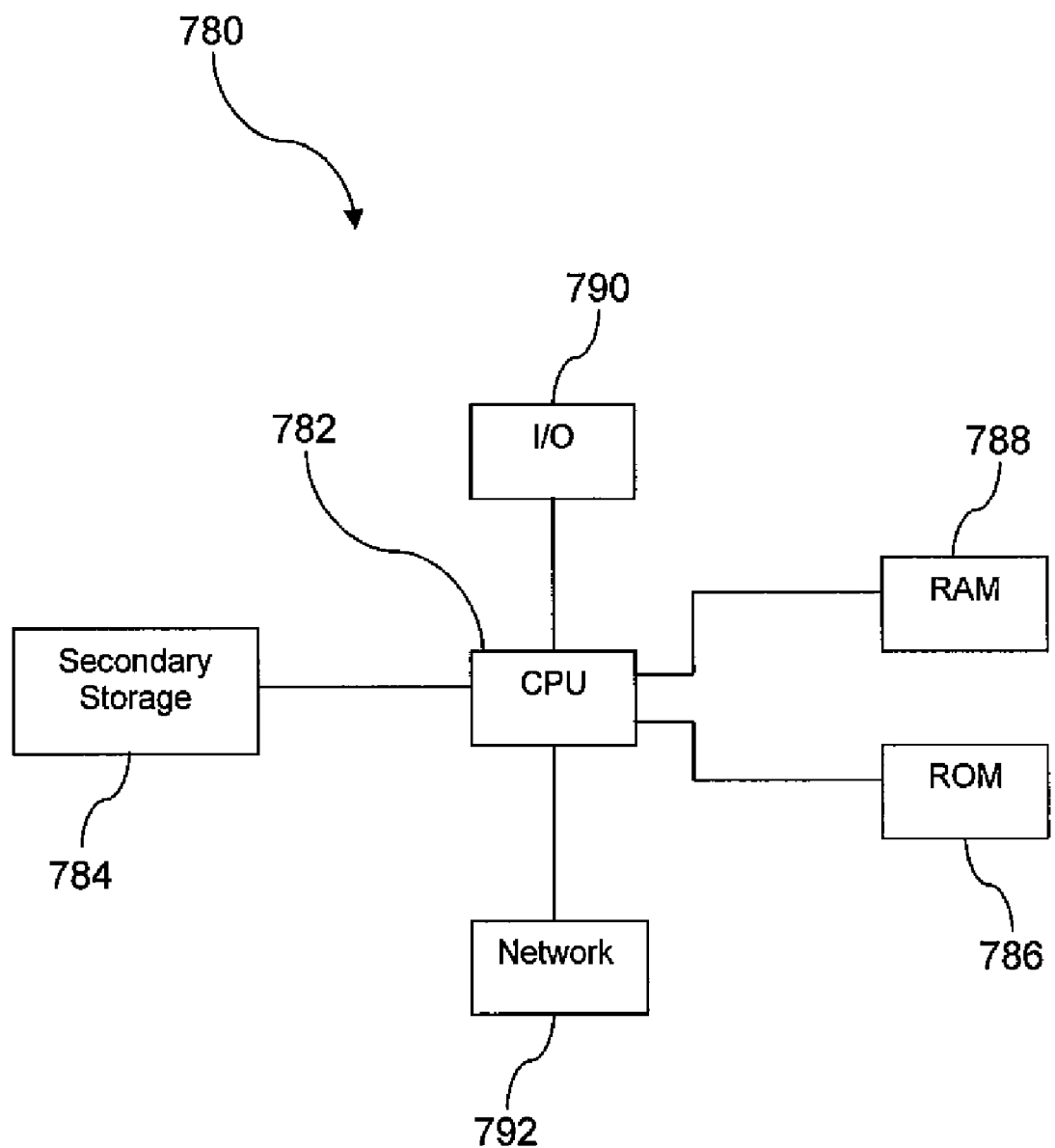
FIG. 6 illustrates an exemplary general purpose computer system suitable for implementing some aspects of the several embodiments of the disclosure.

Some aspects of the system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used to store non-volatile data or over-flow data if RAM 788 is not large enough to hold all working data. Secondary storage 784 may be used to store programs that are loaded into RAM 788 when such programs are selected for execution. The ROM 786 is used to store instructions and perhaps data that are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), universal mobile telephone system (UMTS) and/or worldwide interoperability for microwave access (WiMAX) radio transceiver cards, and other well-known network devices. These network connectivity devices 792 may enable the processor 782 to communicate with an internet or one or more intranets. With such a network connection, the processor 782 might receive information from the network or might output information to the network in the course of performing the above-described method steps. Such information, which is often represented as a sequence of instructions to be executed using processor 782, may be received from and output to the network in the form of a computer data signal embodied in a carrier wave.

Such information, which may include data or instructions to execute using processor 782, may be received from and output to the network in the form of a computer data baseband signal or signal embodied in a carrier wave. The baseband signal or signal embodied in the carrier wave generated by the network connectivity devices 792, may propagate in or on the surface of electrical conductors, in coaxial cables, in waveguides, in optical media (e.g., optical fiber), in the air, or in free space. The information contained in the baseband signal or signal embodied in the carrier wave may be sequenced differently as desired for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 782 executes instructions, codes, computer programs, scripts accessed from the hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A transportation system ticket kiosk, comprising:
a processor;
a near field communication transceiver to communicate with a first mobile device; and
an application, that when executed on the processor,
receives a request message via the near field communication transceiver from the first mobile device to fund transportation for a plurality of passengers;
transmits a fare deduction message via the near field communication transceiver back to the first mobile device with instructions to deduct fares for each of the plurality of passengers from a transit funds balance of the first mobile device;

transmits a first electronic transit ticket to the first mobile device via the near field communication transceiver to admit a first passenger associated with the first mobile device to a transportation system; and transmits a second electronic transit ticket to a second mobile device via the near field communication transceiver to admit a second passenger associated with the second mobile device to the transportation system.

2. The kiosk of claim 1, wherein the application verifies the available transit fund balance on the first mobile device before transmitting the fare deduction message.

3. The kiosk of claim 1, wherein the kiosk dispenses one of a plurality of paper tickets or a plurality of tokens, one for each of the plurality of passengers.

4. The kiosk of claim 1, wherein the application transmits a plurality of electronic transit tickets to the first mobile device, via the near field communication transceiver, to admit the first passenger and at least one additional passenger to a transportation system.

5. The kiosk of claim 1, wherein the first mobile device is one of a mobile phone, a media player, or a personal digital assistant.

6. The kiosk of claim 1, wherein the first mobile device comprises a plurality of transit cards, wherein each transit card of the plurality of transit cards is associated with one of the plurality of passengers, and wherein the fare deduction message comprises instructions to deduct the fares for each of the plurality of passengers by deducting a fare amount associated with each of the transit cards from the transit funds balance of the first mobile device.

7. The kiosk of claim 6, wherein each transit card of the plurality of transit cards is associated with a corresponding transit card funds balance stored in the first mobile device, and wherein the fare deduction message comprises instructions to pay the fares by deducting a fare amount associated with each of the transit cards from the corresponding transit card funds balance.

8. A mobile ticketing system, comprising:
a first mobile device;
a second mobile device; and
a transportation system ticket kiosk comprising:
    a processor;
    a near field communication transceiver to communicate with the first mobile device; and
    an application, that when executed on the processor,
        receives a request message via the near field communication transceiver from the first mobile device to fund transportation for a plurality of passengers,
        transmits a fare deduction message via the near field communication transceiver back to the first mobile device with instructions to deduct fares for each of the plurality of passengers from a transit funds balance of the first mobile device,
        transmits a first electronic transit ticket to the first mobile device via the near field communication transceiver to admit a first passenger associated with the first mobile device to a transportation system, and
        transmits a second electronic transit ticket to the second mobile device via the near field communication transceiver to admit a second passenger associated with the second mobile device to the transportation system.

\* \* \* \* \*